United States Patent
Kinder

(10) Patent No.: US 7,407,463 B2
(45) Date of Patent: Aug. 5, 2008

(54) METHOD AND SYSTEM FOR CONTROLLING A BRAKING SYSTEM EQUIPPED WITH AN ELECTRIC PARKING BRAKE

(75) Inventor: Ralf Kinder, Eitelborn (DE)

(73) Assignee: Lucas Automotive GmbH (DE)

( * ) Notice: Subject to any disclaimer, the term of this patent is extended or adjusted under 35 U.S.C. 154(b) by 95 days.

(21) Appl. No.: 11/282,389

(22) Filed: Nov. 18, 2005

(65) Prior Publication Data

US 2006/0076204 A1 Apr. 13, 2006

Related U.S. Application Data

(63) Continuation of application No. PCT/EP2004/005361, filed on May 18, 2004.

(30) Foreign Application Priority Data

May 28, 2003 (DE) ................................ 103 24 446

(51) Int. Cl.
*B60W 10/00* (2006.01)
*B60W 10/02* (2006.01)
*B60W 10/04* (2006.01)
*B60W 10/18* (2006.01)

(52) U.S. Cl. ................. 477/170; 477/174; 477/182

(58) Field of Classification Search ......... 477/170–172, 477/174, 182

See application file for complete search history.

(56) References Cited

U.S. PATENT DOCUMENTS

2006/0049691 A1* 3/2006 Deprez et al. ................ 303/191
2006/0106520 A1* 5/2006 Bodin et al. ................... 701/67

FOREIGN PATENT DOCUMENTS

| DE | 36 42 874 | 4/1989 |
| DE | 42 18 717 | 12/1993 |
| DE | 102 00 783 | 12/2003 |
| EP | 1 008 503 | 6/2000 |
| EP | 1 300 307 | 4/2003 |
| GB | 2 376 990 | 12/2002 |

* cited by examiner

*Primary Examiner*—Tisha D Lewis
(74) *Attorney, Agent, or Firm*—Macmillan, Sobanski & Todd, LLC

(57) ABSTRACT

In a method and system for controlling a braking system, equipped with an electric parking brake, for a motor vehicle, the electric parking brake is released in response to an identification of a moving-off operation. A release instant of the electric parking brake is defined in dependence on at least one measured parameter of a clutch engagement operation. In comparison with a method and system in which, for example, the electric parking brake is released in dependence on the actuation of the accelerator by a driver, the method and system permit a more precise coordination of the deactivation of the electric parking brake with the clutch engagement operation, and thus with the moving-off operation of the vehicle, particularly in the case of a vehicle equipped with a manual transmission.

13 Claims, 3 Drawing Sheets

METHOD AND SYSTEM FOR CONTROLLING A BRAKING SYSTEM EQUIPPED WITH AN ELECTRIC PARKING BRAKE

CROSS-REFERENCE TO RELATED APPLICATIONS

This application is a continuation of International Application No. PCT/EP2004/005361 filed May 18, 2004, the disclosures of which are incorporated herein by reference, and which claimed priority to German Patent Application No. 103 24 446.8 filed May 28, 2003, the disclosures of which are incorporated herein by reference.

BACKGROUND OF THE INVENTION

The invention relates to a method and a system for controlling a braking system, equipped with an electric parking brake (EPB), for a motor vehicle.

Known in the art, for the purpose of improving driving comfort, is the practice of controlling modern braking systems, that are equipped with an electric parking brake, in such a way that automatic activation and deactivation of the electric parking brake is possible in addition to manual actuation. The EPB is automatically activated, for example, as soon as the vehicle is stationary, and is automatically released again as soon as a moving-off operation of the vehicle is identified. The moving-off operation is identified, for example, on the basis of the detection of an actuation of the accelerator by the driver.

In the case of the automatic release of the electric parking brake in response to the identification of a moving-off operation, however, there is the problem, particularly in the case of fast moving-off operations of a vehicle equipped with a manual transmission, that the electric parking brake, owing to its response time from the start of its deactivation to the complete removal of the braking forces, cannot be fully released with sufficient speed to permit unimpeded moving-off of the vehicle. Owing to the braking forces, applied by the EPB, which have not yet been fully removed at this instant, there is an unpleasant jolt on the rear axle of the vehicle which is perceptible by the driver upon moving-off of the vehicle.

BRIEF SUMMARY OF THE INVENTION

The invention is based on the object of providing a method and a system for controlling a braking system equipped with an electric parking brake, which method and system render possible jolt-free moving-off that is comfortable for the driver, even in the case of fast moving-off operations of a vehicle equipped with a manual transmission.

This object is achieved by a control method having the features stated in the appended claim 1, and by a control system having the features stated in the appended claim 10. In the case of this method and system, the electric parking brake is released in response to the identification of a moving-off operation, wherein, according to the invention, a release instant of the electric parking brake is defined in dependence on at least one measured parameter of a clutch engagement operation. In comparison with a method and system in which, for example, the electric parking brake is released solely in dependence on the actuation of the accelerator by a driver, the method and system according to the invention permit a more precise coordination of the deactivation of the electric parking brake with the clutch engagement operation, and thus with the moving-off operation of the vehicle, particularly in the case of a vehicle equipped with a manual transmission.

In the case of the method and system according to the invention, the clutch engagement operation is expediently monitored by means of suitable measuring devices. For example, the start of the clutch engagement operation, or further parameters which characterize the course of the clutch engagement operation, such as the clutch engagement speed, may be detected by means of suitable sensors and the release instant of the EPB then defined in response to the parameter or parameters of the clutch engagement operation detected by the sensors. In this case, the response time of the EPB, i.e. the time required for complete removal of the braking forces applied by the EPB, may also be taken into account in the definition of an appropriate release instant of the electric parking brake. The appropriate selection of the release instant of the EPB in dependence on the detected parameters of the clutch engagement operation renders possible a jolt-free moving-off of the vehicle that is comfortable for the driver.

A first time interval, from the start of the clutch engagement operation until a clutch operating instant (clutch response), is preferably determined by estimating, measuring or retrieving a stored value, etc. The release instant of the electric parking brake is then chosen such that it precedes the clutch operating instant by a second time interval. In the case of this embodiment of the invention, the time interval from the start of the clutch engagement operation to the clutch operating instant, i.e. the instant from which a transmission of force occurs from the clutch to the driven axle and enables the vehicle to be moved off, is used for the removal of the braking forces applied by the electric parking brake. It can thereby be ensured that the electric parking brake has fully released when the clutch operates, thereby permitting unimpeded, comfortable and jolt-free moving-off, even in the case of fast moving-off operations.

The second, possibly predetermined, time interval by which the release instant of the electric parking brake precedes the clutch operating instant may be approximately 200 to 600 ms, and preferably approximately 400 ms. If the second time interval corresponds to the usual response time of an electric parking brake, it can be ensured, in a simple manner, that the braking forces applied by the EPB have been fully removed when the clutch operates, and thus when the vehicle moves off.

The identification of the clutch operating instant is preferably effected through the detection of a change in the engine speed or in the engine torque, or through the detection of a change in the acceleration of the vehicle. At the clutch operating instant, the above-mentioned engine data, and the acceleration of the vehicle, undergo a change that is characteristic of this instant. The detection of this characteristic change can therefore be used for the identification of the clutch operating instant.

The change in the engine speed or engine torque may be detected by a rotational-speed sensor or a torque sensor, and the change in the acceleration of the vehicle may be detected by an acceleration sensor, or by other means. Such sensors are present, in any case, in the majority of vehicles equipped with a modern braking system (e.g. EPB), with the result that no additional devices and/or no additional software need be provided for detecting and/or evaluating these data.

In the case of a further preferred embodiment of the invention, a clutch travel to be covered from the start of the clutch engagement operation until the clutch operating instant is detected and stored. The first time interval, from the start of the clutch engagement operation to the clutch operating instant, is determined from the clutch engagement speed and the clutch travel to be covered from the start of the clutch engagement operation until the clutch operating instant. The metrological detection of at least one of these parameters, namely, of the clutch travel, therefore enables the first time interval to be determined more precisely than would be possible through, for example, mere estimation of both parameters.

The detection and storage of the clutch travel to be covered from the start of the clutch engagement operation until the clutch operating instant is preferably effected during each moving-off operation or at given intervals. Since the clutch travel to be covered until the clutch operating instant is dependent on the temperature and, in particular, on the wear of the clutch, the regular detection of the clutch travel during each moving-off operation ensures that current clutch travel values are always available for the determination of the first time interval. The clutch travel values detected during each moving-off operation may be stored in a suitable storage means, which may be connected, for example, to an electronic control unit.

The clutch travel that is to be covered from the start of the clutch engagement operation until the clutch operating instant, and that is detected during a moving-off operation, may be filtered (e.g. averaged), prior to storage, with a value, detected and stored during a previous moving-off operation, of the clutch travel to be covered from the start of the clutch engagement operation until the clutch operating instant. The clutch travel value used for filtering the clutch travel value detected in a current moving-off operation may be, for example, the clutch travel determined in the immediately preceding moving-off operation. Such filtering permits, for example, rapid and simple identification of measurement errors, and thereby ensures a greater functional reliability of the method and system according to the invention.

The detection of the clutch travel to be covered from the start of the clutch engagement operation until the clutch operating instant is preferably effected by a clutch-travel sensor, whereby a simple and reliable detection of the clutch travel can be assured.

According to a variation of the invention, a clutch engagement speed is detected during each moving-off operation, or at intervals. The first time interval, from the start of the clutch engagement operation to the clutch operating instant, can then be determined (e.g. estimated or calculated) from the detected clutch engagement speed and a stored value of the clutch travel to be covered from the start of the clutch engagement operation until the clutch operating instant. As already explained, the duration of the first time interval, from the start of the clutch engagement operation to the clutch operating instant, depends on the clutch engagement speed, i.e. the speed at which a driver of the vehicle releases the clutch pedal, and on the clutch travel to be covered from the start of the clutch engagement operation until the clutch operating instant. The determination of the first time interval directly from these two values therefore permits a very precise and reliable determination of this time interval. It is possible for the first time interval to be determined in a manner which is particularly precise, and virtually independent of temperature and wear, if a value of the clutch travel that is as current as possible, for example the clutch travel value detected in the immediately preceding moving-off operation, is used for the calculation.

A plurality of possibilities are available for the determination of the first time interval on the basis of the clutch engagement speed and the clutch travel to be covered from the start of the clutch engagement operation until the clutch operating instant. For example, the first time interval may be currently calculated during each clutch engagement operation. It is also possible for values of the first time interval, that have been calculated in preceding moving-off operations, to be stored, together with clutch engagement speeds and clutch travels on which the calculation is based, in a lookup table, and for a matching value of the first time interval to be used from the lookup table in response to the detection of the clutch engagement speed. In order to ensure that determination of the first time interval on the basis of the lookup table is as precise as possible, the values stored in the lookup table should be updated regularly.

The clutch engagement speed is preferably detected during the clutch engagement operation, and a value of the first time interval that is determined on the basis of a clutch engagement speed detected at the start of the clutch engagement operation is updated if the clutch engagement speed changes during the clutch engagement operation. The measurement of the clutch engagement speed is effected, for example, continuously or at short intervals of time, i.e. in such a manner that variations of the clutch engagement speed during the clutch engagement operation can be detected. Such variations in the clutch engagement speed occur, for example, if a vehicle driver at first releases the clutch pedal quickly and then more slowly in the subsequent course of the clutch engagement operation, or vice versa.

Provision may be made for updating of the value of the first time interval if, for example, the difference between the clutch engagement speed detected at the start of the clutch engagement operation and a clutch engagement speed measured currently during the clutch engagement operation exceeds a predetermined threshold value. The calculation of an updated value of the first time interval may be effected in various ways. For example, it is possible to calculate a first portion of the first time interval on the basis of, on the one hand, the clutch engagement speed detected at the start of the clutch engagement operation and, on the other hand, the clutch travel covered until the attainment of the threshold value, and to calculate a second portion of the first time interval on the basis of the clutch engagement speed measured upon attainment of the threshold value, and the remaining clutch travel to be covered until the clutch operating instant. The updated value of the total first time interval then corresponds to the sum of the first and second portions of the first time interval calculated in such manner. It is also possible, however, for correction factors for the first time interval to be assigned, for example in a lookup table, to the respective changes in the clutch engagement speed, i.e. to the respective differences between the clutch engagement speed detected at the start of the clutch engagement operation and a clutch engagement speed measured currently during the clutch engagement operation, and for the updated value of the first time interval to be determined using these correction factors.

In the case of a preferred embodiment of the invention, the detected clutch travel that is to be covered from the start of the clutch engagement operation until the clutch operating instant is compared with a reference clutch travel, and the state of wear of the clutch is thereby determined. The clutch travel of a new, unworn clutch, which travel is to be covered from the start of the clutch engagement operation until the clutch operating instant, may be used, for example, as a reference clutch travel. The wear of the clutch is then obtained from a difference between the measured clutch travel and the predetermined reference value. If, in particular, the clutch travel to be covered from the start of the clutch engagement operation until the clutch operating instant is detected during each moving-off operation, the comparison of this measured value with the predetermined reference value provides very precise information on the current state of wear of the clutch.

A warning signal is preferably emitted to a driver of the motor vehicle if a differential value between the detected clutch travel and the reference clutch travel, said differential value characterizing the state of wear of the clutch, exceeds a predetermined threshold value. The warning signal may be a visual or audible signal which is emitted to the driver, for example, upon each startup of the motor vehicle.

Other advantages of this invention will become apparent to those skilled in the art from the following detailed description of the preferred embodiments, when-read-in light of the accompanying drawings.

DETAILED DESCRIPTION OF THE INVENTION

Figure 1:
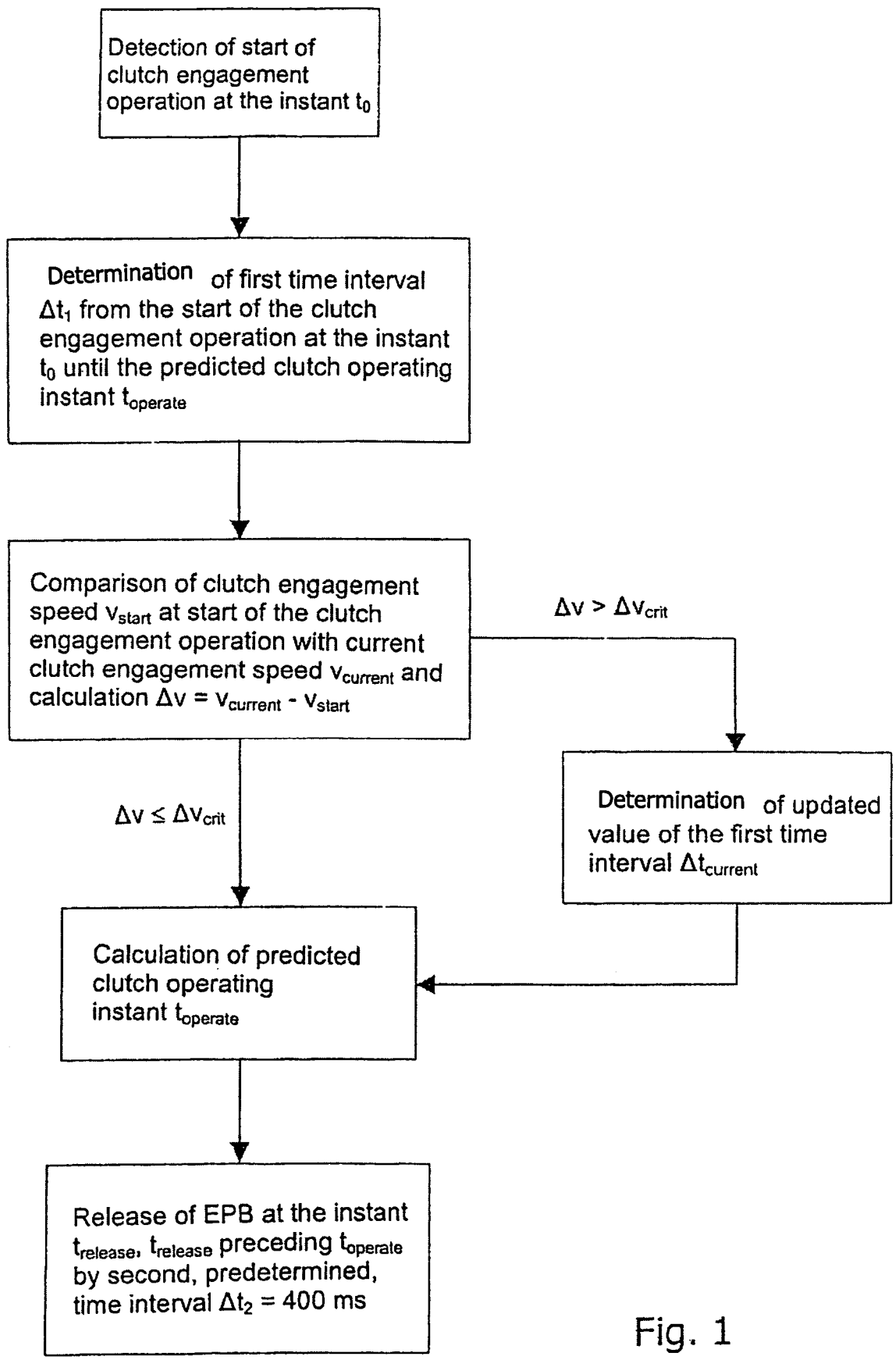
FIG. 1 shows a flow diagram of an exemplary embodiment of the method, according to the invention, for controlling a braking system equipped with an EPB.

The flow diagram represented in FIG. 1 shows, in schematic form, the steps of a method for controlling a braking system equipped with an electric parking brake. In a first method step, the start of a clutch engagement operation is detected at an instant $t_0$ by means of a suitable measuring device such as, for example, a clutch-travel sensor or the like. In a second method step, a first time interval $\Delta t_1$ from the start of the clutch engagement operation at the instant $t_0$ until a predicted operating instant $t_{operate}$ of the clutch is determined by estimation. The clutch operating instant $t_{operate}$ represents the moment from which a transmission of force occurs from the clutch to the driven axle of the motor vehicle, and thus enables the vehicle to move off.

Figure 2:
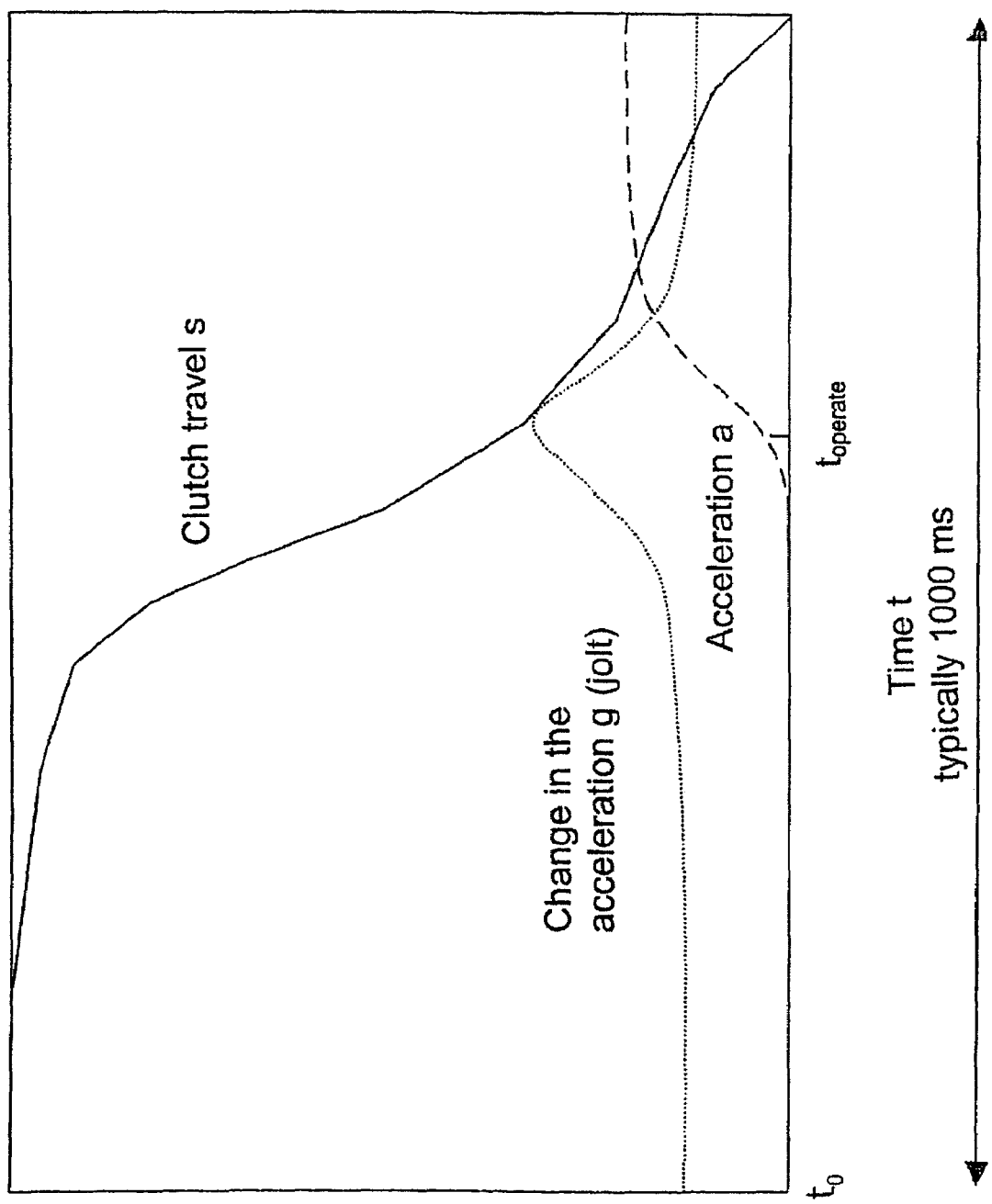
FIG. 2 shows a diagram representing the course of the clutch travel, of the acceleration and of the change in the acceleration of a vehicle as a function of time, during the clutch engagement operation.

The diagram represented in FIG. 2 shows the course of the clutch travel s (unbroken line), of the acceleration a (dashed line) and of the change in the acceleration g (dotted line) of a vehicle equipped with a manual transmission, as a function of the time t, during a clutch engagement operation typically lasting 1000 ms. If, at the instant $t_0$, a driver of the vehicle begins to release the depressed clutch pedal and thereby to initiate the clutch engagement operation, an idling travel of the clutch, which is dependent on the temperature and, in particular, on the wear of the clutch, must first be covered before the clutch "bites" at the instant $t_{operate}$ and permits a moving-off of the vehicle associated with an increase in the acceleration a.

At the operating instant $t_{operate}$ of the clutch, there is a change in the acceleration of the vehicle, said change being characteristic of this instant, and being identifiable in the form of a peak in FIG. 2. Owing to said change, the clutch operating instant $t_{operate}$ can be easily identified through the detection, by means of a suitable sensor, of the change in the acceleration g that is characteristic of this instant. Depending on the technical equipment of the vehicle, the (longitudinal) acceleration can be detected by measurement either directly, by means of a longitudinal-acceleration sensor, or indirectly, for example through evaluation of data of a yaw-rate and/or transverse-acceleration sensor, or through evaluation of the data of a wheel-rpm or speed sensor.

Since, at the clutch operating instant $t_{operate}$, the engine speed and the engine torque also undergo a change that is characteristic of this instant, it is equally possible to determine the clutch operating instant $t_{operate}$ on the basis of detection of these motor data by means of suitable sensors.

Figure 3:
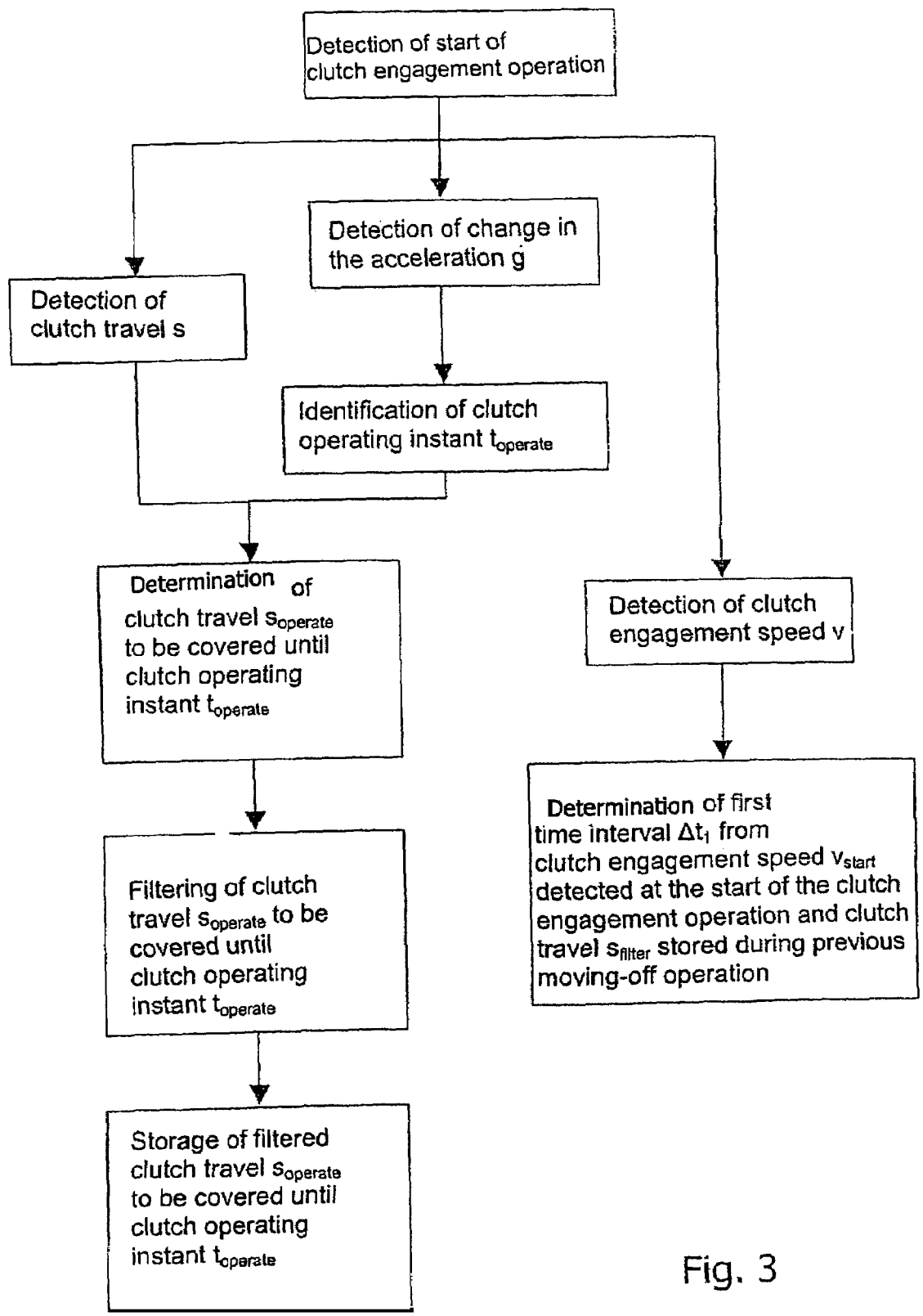
FIG. 3 shows a flow diagram illustrating the determination of a first time interval from the start of a clutch engagement operation until the attainment of a clutch operating instant, in the context of the control method according to the invention.

The determination of the first time interval $\Delta t_1$, from the start of the clutch engagement operation at the instant $t_0$ until the predicted clutch operating instant $t_{operate}$, is now explained with reference to the flow diagram represented in FIG. 3.

During a moving-off operation of the vehicle, the clutch travel s and the change in the acceleration g of the vehicle are continuously detected, in response to the start of a clutch engagement operation, by means of a clutch-travel sensor and a longitudinal-acceleration sensor respectively. As explained above in connection with FIG. 2, upon operation of the clutch the change in the acceleration g of the vehicle has a characteristic peak, with the result that the attainment of the clutch operating instant $t_{operate}$ can be identified on the basis of this characteristic peak, and the clutch travel $s_{operate}$ to be covered from the start of the clutch engagement operation until the clutch operating instant $t_{operate}$ can be determined. The peak is perceptible, as a jolt, to the driver.

In a subsequent step, the ascertained clutch travel $s_{operate}$ to be covered from the start of the clutch engagement operation until the clutch operating instant $t_{operate}$ is filtered with a value of the clutch travel $s_{operate}$ that has been detected and stored during a previous moving-off operation, in order that any measurement errors can be more rapidly identified and the functional reliability of the method improved.

Finally, the filtered value of the clutch travel $s_{filter}$ to be covered from the start of the clutch engagement operation until the clutch operating instant $t_{operate}$ is stored in a suitable storage means that is connected to an electronic control unit. These steps are performed again during each moving-off operation of the vehicle. It is thereby ensured that the stored, filtered value of the clutch travel $S_{filter}$ to be covered from the start of the clutch engagement operation until the clutch operating instant $t_{operate}$ always represents the current clutch travel to be covered until the clutch operating instant $t_{operate}$, which clutch-travel is dependent on the temperature and, in particular, the state of wear of the clutch.

In addition to the detection of the clutch travel s and the detection of the change in the acceleration g of the vehicle, a continuous detection of a clutch engagement speed v, i.e. of the speed at which the driver of the vehicle releases the clutch pedal, is also initiated in response to the start of the clutch engagement operation, said detection lasting throughout the entire clutch engagement operation. The duration of the first time interval $\Delta t_1$, from the start of the clutch engagement operation at the instant $t_0$ until a predicted operating instant $t_{operate}$ of the clutch, is determined from the clutch engagement speed v and the clutch travel to be covered until the operation of the clutch. In a subsequent step, therefore, the first time interval $\Delta t_1$ can be calculated according to the equation $$\Delta t_1 = s_{filter}/v_{start},$$

wherein $v_{Start}$ is a clutch engagement speed detected at the start of the clutch engagement operation and $s_{filter}$ is a value of the clutch travel to be covered from the start of the clutch engagement operation until the clutch operating instant $t_{operate}$, said value having been detected, filtered and stored in the immediately preceding moving-off operation.

Since the clutch engagement speed v is measured throughout the entire clutch engagement operation, it is possible to check continuously, as shown in FIG. 1, whether the clutch engagement speed v changes over the duration of the clutch engagement operation or remains substantially constant. A variation of the clutch engagement speed v always occurs if the vehicle driver at first releases the clutch pedal quickly and then more slowly in the subsequent course of the clutch engagement operation, or vice versa. If a difference $\Delta v$ between the clutch engagement speed $v_{start}$, that is detected at the start of the clutch engagement operation and taken as the basis of the calculation of the first time interval $\Delta t_1$, and a clutch engagement speed $v_{current}$, that is measured during the clutch engagement operation, exceeds a predetermined threshold value $\Delta v_{crit}$, an updated value of the first time interval $\Delta t_{1current}$ is determined. The updated value of the first time interval $\Delta t_{1current}$ is calculated using the equation $$\Delta t_{1current} = s_{current}/v_{start} + (s_{filter} - s_{current})/v_{current},$$

wherein $s_{current}$ represents the clutch travel covered up to the exceeding of the predetermined threshold value $\Delta v_{crit}$ and detected by means of the clutch-travel sensor.

As further shown by FIG. 1, the predicted clutch operating instant $t_{operate}$ is then determined, in a subsequent step, using the equations $$t_{operate} = t_0 + \Delta t_1$$

and $$t_{operate} = t_0 + \Delta t_{1current}$$

In order to enable the vehicle to move off in an unimpeded, comfortable and jolt-free manner, there follows, in the final step of the control method, the deactivation of the electric parking brake at a release instant $t_{release}$, which precedes the ascertained, predicted clutch operating instant $t_{operate}$ by a second, predetermined, time interval $\Delta t_2$. The second, predetermined, time interval $\Delta t_2$ is typically approximately 400 ms, this corresponding to the usual response time of an electric parking brake from the start of its deactivation until the complete removal of the braking forces applied by same. It is thereby ensured that the braking forces applied by the EPB have been completely removed when the clutch operates.

In the case of an exemplary embodiment, described here, of a control method for a braking system equipped with an electric parking brake, the clutch travel $s_{filter}$ to be covered until the operation of the clutch, that is detected, filtered and stored in a suitable storage means during each moving-off operation of the vehicle, is used not only for calculating the first time interval $\Delta t_1$ from the start of the clutch engagement operation until the clutch operating instant $t_{operate}$, but also for monitoring the wear of the clutch. For this purpose, during each moving-off operation, the stored clutch travel $s_{filter}$ to be covered until the operation of the clutch is compared with a reference clutch travel $s_{Ref}$ and formed as a differential value $\Delta s = s_{filter} - s_{Ref}$. Here, the reference clutch travel $s_{Ref}$ represents the clutch travel, to be covered from the start of the clutch engagement operation until the clutch operating instant, of a new, unworn, clutch, with the result that the differential value $\Delta s$ corresponds to the current wear of the clutch. If the differential value $\Delta s$ that is characteristic of the state of wear of the clutch exceeds a predetermined threshold value $\Delta s_{crit}$, a visual or audible signal is output to the driver of the motor vehicle upon each startup of the motor vehicle.

A further exemplary embodiment, not represented in the figures, of a method for controlling a braking system equipped with an electric parking brake differs from the exemplary embodiment described above and represented in FIGS. 1 to 3 in that the first time interval $\Delta t_1$ is not calculated currently during each clutch engagement operation. Instead, the value of the first time interval $\Delta t_1$ is taken from a lookup table, in which values of the first time interval $\Delta t_1$ calculated during previous moving-off operations are stored together with the clutch engagement speeds v and clutch travels $s_{filter}$ which form the basis of the calculation. An appropriate value of the first time interval $\Delta t_1$ is selected from the lookup table on the basis of the clutch engagement speed v measured during the clutch engagement operation, in which case the value used should be a value of the first time interval $\Delta t_1$, stored in the lookup table, that is as current as possible, in order to take account of the variations of the clutch travel to be covered until the operation of the clutch which result from temperature fluctuations and, in particular, from wear of the clutch.

In accordance with the provisions of the parent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling a vehicle braking system equipped with an electric parking brake, wherein the electric parking brake is released in response to the identification of a moving-off operation, a release instant of the electric parking brake being defined in dependence on at least one measured parameter of a clutch engagement operation, comprising the steps:
    determining a first time interval from the start of the clutch engagement operation until a clutch operating instant;
    selecting a release instant of the electric parking brake such that it precedes the clutch operating instant by a second time interval; and
    releasing the electric parking brake in accordance with the selected release instant.

2. The method according to claim 1, wherein the clutch operating instant is identified through at least one of a detection of a change in engine speed, a detection of a change of in engine torque, and a detection of a change in acceleration of the vehicle.

3. A method according to claim 1, wherein a clutch travel to be covered from the start of the clutch engagement operation until the clutch operating instant is detected and stored.

4. The method according to claim 3, wherein the clutch travel that is to be covered from the start of the clutch engagement operation until the clutch operating instant, and that is detected during the moving-off operation, is filtered, prior to storage, with a value of the clutch travel detected and stored during a previous moving-off operation.

5. The method according to claim 1, wherein a clutch engagement speed is detected during each moving-off operation.

6. The method according to claim 5, wherein the first time interval, from the start of the clutch engagement operation until the clutch operating instant is determined from the detected clutch engagement speed and a stored value of the clutch travel to be covered from the start of the clutch engagement operation until the clutch operating instant.

7. The method according to claim 5, wherein the clutch engagement speed is detected during the clutch engagement operation, and a value of the first time interval that is determined on the basis of a clutch engagement speed detected at the start of the clutch engagement operation is updated if the clutch engagement speed changes during the clutch engagement operation.

8. The method according to claim 2, wherein a detected clutch travel that is to be covered from the start of the clutch engagement operation until the clutch operating instant is compared with a reference clutch travel, and the state of wear of the clutch is thereby determined.

9. A system for controlling a braking system equipped with an electric parking brake, which system is set up to release the electric parking brake in response to the identification of a moving-off operation, the system comprises a device for detecting at least one parameter of a clutch engagement operation, and being set up to define a release instant of the electric parking brake in dependence on the at least one measured parameter of the clutch engagement operation, wherein the system is set up to determine a first time interval from the start of the clutch engagement operation until a clutch operating instant and to define the release instant of the electric parking brake such that it precedes the clutch operating instant by a second, predetermined, time interval.

10. System according to claim 9, wherein the system comprises an engine-speed sensor, an engine-torque sensor or a sensor which measures a quantity that is characteristic of the acceleration, and the clutch operating instant is identified through the detection of a change in the engine speed or in the engine torque, or through the detection of a change in the acceleration of the vehicle.

11. The system according to claim 9, wherein the system comprises a clutch-travel sensor, for detecting a clutch travel to be covered from the start of the clutch engagement operation until the clutch operating instant and a storage device, for storing the detected clutch travel to be covered from the start of the clutch engagement operation until the clutch operating instant.

12. The system according to claim 11, wherein the system comprises a device for detecting a clutch engagement speed and is set up to determine the first time interval, from the start of the clutch engagement operation until the clutch operating instant, from the detected clutch engagement speed and a stored value of the clutch travel to be covered from the start of the clutch engagement operation until the clutch operating instant.

13. The system according to claim 11, wherein the system comprises a device for determining clutch wear, which device compares the detected clutch travel to be covered from the start of the clutch engagement operation until the clutch operating instant with a reference clutch travel.

* * * * *